（12） United States Patent
Shen et al.

(10) Patent No.: US 11,371,496 B2
(45) Date of Patent: Jun. 28, 2022

(54) ECCENTRIC SLEEVE FOR CRANKSHAFT OF COMPRESSOR, CRANKSHAFT, CRANKSHAFT ASSEMBLY AND COMPRESSOR

(71) Applicant: ANHUI MEIZHI COMPRESSOR CO., LTD., Anhui (CN)

(72) Inventors: Xuebao Shen, Anhui (CN); Gang Huang, Anhui (CN)

(73) Assignee: ANHUI MEIZHI COMPRESSOR CO., LTD., Hefei (CN)

( * ) Notice: Subject to any disclaimer, the term of this patent is extended or adjusted under 35 U.S.C. 154(b) by 421 days.

(21) Appl. No.: 16/736,261

(22) Filed: Jan. 7, 2020

(65) Prior Publication Data
US 2020/0149521 A1 May 14, 2020

Related U.S. Application Data

(63) Continuation of application No. PCT/CN2019/082570, filed on Apr. 12, 2019.

(30) Foreign Application Priority Data

Apr. 13, 2018 (CN) .......................... 201820531816.0
Apr. 13, 2018 (CN) .......................... 201820531822.6

(51) Int. Cl.
*F02B 75/00* (2006.01)
*F16J 1/14* (2006.01)
(Continued)

(52) U.S. Cl.
CPC ........ *F04B 39/0246* (2013.01); *F02B 75/045* (2013.01); *F04B 39/0292* (2013.01); *F16J 1/14* (2013.01); *F16J 7/00* (2013.01)

(58) Field of Classification Search
CPC .......... F04C 2240/603; F16J 1/14; F16J 7/00; F04B 39/0094; F04B 49/123; F04B 49/126
See application file for complete search history.

(56) References Cited

U.S. PATENT DOCUMENTS 1,588,720 A * 6/1926 Gilbert ................. F16F 15/261
74/604
3,491,939 A * 1/1970 Bent .................... F04B 39/0094
417/372
(Continued)

FOREIGN PATENT DOCUMENTS

CN 206770164 U 12/2017
CN 207111348 U 3/2018
(Continued)

OTHER PUBLICATIONS

Notice of Reasons for Refusal dated Nov. 24, 2020 received in Japanese Patent Application No. JP 2019-563155 together with an English language translation.
(Continued)

*Primary Examiner* — Long T Tran
(74) *Attorney, Agent, or Firm* — Scully Scott Murphy & Presser

(57) ABSTRACT

An eccentric sleeve for a crankshaft of a compressor, a crankshaft, a crankshaft assembly, and a compressor are provided. The crankshaft has a main shaft, a counterbalance and an eccentric shaft. The main shaft and the eccentric shaft are provided at two sides of the counterbalance and arranged eccentrically. The main shaft is internally provided with a main lubrication oil passage. An outer circumferential wall of the eccentric shaft is provided with an oil leakage hole in fluid communication with the main lubrication oil passage. The eccentric sleeve is fitted over the eccentric shaft. An outer circumferential wall of the eccentric sleeve is provided
(Continued)

with a shaft flow hole extending through the outer circumferential wall in a thickness direction of the eccentric sleeve.

20 Claims, 5 Drawing Sheets

(51) Int. Cl.
*F04B 49/12* (2006.01)
*F04B 39/02* (2006.01)
*F02B 75/04* (2006.01)
*F16J 7/00* (2006.01)

(56) References Cited

U.S. PATENT DOCUMENTS

| | | | | |
|---|---|---|---|---|
| 3,495,472 A * | 2/1970 | Long | ............... | B30B 1/26 74/44 |
| 4,050,544 A * | 9/1977 | Kalyan | ............... | F01M 1/02 464/7 |
| 4,741,303 A * | 5/1988 | Kronich | ............... | F01M 9/06 123/196 R |
| 5,237,892 A * | 8/1993 | Fry | ............... | F16C 3/10 74/595 |
| 5,910,195 A * | 6/1999 | Ziemer | ............... | F16C 33/76 74/595 |
| 6,132,177 A * | 10/2000 | Loprete | ............... | F04B 39/0246 417/221 |
| 6,427,657 B1 * | 8/2002 | Egleston | ............... | F02B 75/246 123/192.2 |
| 2004/0241013 A1 | 12/2004 | Park et al. | | |
| 2013/0336765 A1 * | 12/2013 | Manke | ............... | F04B 39/0253 415/110 |
| 2017/0175601 A1 * | 6/2017 | Usa | ............... | F02F 1/24 |
| 2019/0085739 A1 * | 3/2019 | Tanaka | ............... | F01M 1/02 |

FOREIGN PATENT DOCUMENTS

| | | |
|---|---|---|
| CN | 208040660 U | 11/2018 |
| CN | 208518838 U | 2/2019 |
| JP | S63-253188 A | 10/1988 |
| JP | 2009-270444 A | 11/2009 |
| JP | 2010-084584 A | 4/2010 |

OTHER PUBLICATIONS

International Search Report dated Jun. 27, 2019 received in PCT/CN2019/082570.

* cited by examiner

ECCENTRIC SLEEVE FOR CRANKSHAFT OF COMPRESSOR, CRANKSHAFT, CRANKSHAFT ASSEMBLY AND COMPRESSOR

CROSS-REFERENCE TO RELATED APPLICATIONS

The present disclosure is a continuation application of International Application No. PCT/CN2019/082570, filed Apr. 12, 2019 and claims the priority of Chinese Patent Applications Serial No. 201820531822.6 and No. 201820531816.0, filed with the National Intellectual Property Administration of P. R. China on Apr. 13, 2018, the entire contents of which are incorporated herein by reference for all purposes. No new matter is added.

FIELD

The present disclosure relates to a technical field of refrigeration devices, more particularly to an eccentric sleeve for a crankshaft of a compressor, a crankshaft, a crankshaft assembly and a compressor.

BACKGROUND

A hermetic reciprocating refrigeration compressor is a core component of a small refrigeration device such as a refrigerator and a freezer. With improvement of people's living standard in modern society, consumer's demand for small refrigeration device such as the refrigerator and the freezer continuously increases, promoting rapid development of household appliance industry and magnifying competition of the household appliance industry. Providing a product of low energy consumption, high performance and high quality for the consumer becomes the most powerful development direction in the competition of the industry. Meanwhile, novelty and inventiveness of the product also becomes a powerful means of competition in the household appliance industry for attracting customers.

The launching of the hermetic reciprocating variable-displacement refrigeration compressor causes the household appliance manufacturer to hold an active advantage in the competition, it drives a rotor, a crankshaft to realize positive and negative rotation of the compressor under the action of an electromagnetic field of an electric motor, and it realizes variation of piston stroke during positive and negative rotation of the compressor through an eccentric sleeve between the crankshaft and the connecting rod, to realize variable-displacement refrigeration of the compressor. As a core component of the hermetic reciprocating variable-displacement refrigeration compressor, merits and drawbacks of the structural design of the eccentric sleeve directly influence the performance of the compressor.

In the related art, the eccentric sleeve of the crankshaft serves as a main component for converting eccentricity of the crankshaft between the eccentric shaft of the crankshaft of the compressor and the connecting rod, and has a certain hindrance to transfer of lubrication oil to a friction face of the connecting rod, resulting in an increase of frictional loss of the eccentric sleeve and the connecting rod. Meanwhile, frictional losses between the eccentric sleeve and the crankshaft, as well as between the eccentric sleeve and the connecting rod increase input work loss of the compressor.

SUMMARY

Embodiments of the present disclosure seek to solve at least one of the problems existing in the related art. To this end, the present disclosure proposes an eccentric sleeve for a crankshaft of a compressor, which can reduce friction between the eccentric sleeve and a connecting rod.

The present disclosure further proposes a crankshaft assembly for a compressor, which includes the above-described eccentric sleeve.

The present disclosure further proposes a compressor, which includes the above-described crankshaft assembly.

In the eccentric sleeve for the crankshaft of the compressor according to embodiments of the present disclosure, the crankshaft includes a main shaft, a counterbalance and an eccentric shaft. The main shaft and the eccentric shaft are provided at two sides of the counterbalance respectively and eccentrically arranged. The main shaft is internally provided with a main lubrication oil passage, and an outer circumferential wall of the eccentric shaft is provided with an oil leakage hole in fluid communication with the main lubrication oil passage. The eccentric sleeve is fitted over the eccentric shaft and is opposite the oil leakage hole, and an outer circumferential wall of the eccentric sleeve is provided with a shaft flow hole therethrough in a thickness direction of the eccentric sleeve.

In the eccentric sleeve for the crankshaft of the compressor according to embodiments of the present disclosure, the outer circumferential wall of the eccentric sleeve is provided with the shaft flow hole therethrough in the thickness direction of the eccentric sleeve, such that the lubrication oil between the eccentric shaft and the eccentric sleeve conveniently flows between the eccentric sleeve and the connecting rod through the shaft flow hole, and friction between the eccentric sleeve and the connecting rod can be reduced.

According to some embodiments of the present disclosure, the eccentric shaft is further provided with an annular oil groove, and the annular oil groove is in fluid communication with the oil leakage hole and is opposite the shaft flow hole.

In some embodiments of the present disclosure, the oil leakage hole is defined in a bottom wall of the annular oil groove.

According to some embodiments of the present disclosure, the outer circumferential wall of the eccentric sleeve is provided with a plurality of oil grooves in fluid communication with the shaft flow hole.

In some embodiments of the present disclosure, the plurality of oil grooves are spaced apart in a circumferential direction of the shaft flow hole.

According to some embodiments of the present disclosure, two axial ends of the shaft flow hole each have a guide ramp.

According to some embodiments of the present disclosure, a connecting rod of the compressor has an end fitted over the eccentric shaft, the shaft flow hole is arranged close to a centerline of the eccentric sleeve perpendicular to an extension line of the connecting rod, when the extension line of the connecting rod is parallel to a connection line between the main shaft and the eccentric shaft and the eccentric shaft is located between the main shaft and the connecting rod.

According to some embodiments of the present disclosure, the main lubrication oil passage extends from an axial end of the main shaft to the other axial end of the main shaft, an outer surface of the main shaft is provided with a plurality of oil outlets spaced apart from each other, and each of the oil outlets is in fluid communication with the main lubrication oil passage.

The crankshaft assembly for the compressor according to embodiments of the present disclosure includes a crankshaft including a main shaft, a counterbalance and an eccentric shaft, the main shaft and the eccentric shaft being provided at two sides of the counterbalance respectively and eccentrically arranged, the main shaft being internally provided with a main lubrication oil passage, an outer circumferential wall of the eccentric shaft being provided with an oil leakage hole in fluid communication with the main lubrication oil passage; the above-described eccentric sleeve fitted over the eccentric shaft; and a connecting rod and a piston, the connecting rod having a first end fitted over the eccentric sleeve and a second end connected to the piston.

In the crankshaft assembly for the compressor according to embodiments of the present disclosure, the outer circumferential wall of the eccentric sleeve is provided with the shaft flow hole therethrough in the thickness direction of the eccentric sleeve, such that the lubrication oil between the eccentric shaft and the eccentric sleeve conveniently flows between the eccentric sleeve and the connecting rod through the shaft flow hole, and friction between the eccentric sleeve and the connecting rod can be reduced.

According to some embodiments of the present disclosure, an end surface of an end of the eccentric sleeve away from the counterbalance is provided with a first column and a second column spaced apart in a circumferential direction of the eccentric sleeve; and the crankshaft assembly further includes an eccentric shaft pin, the outer circumferential wall of the eccentric shaft is provided with an eccentric shaft pin hole fitted with the eccentric shaft pin, and the eccentric shaft pin is located between the first column and the second column to selectively engage the first column and the second column.

In some embodiments of the present disclosure, the crankshaft assembly further includes an elastic pin, an end surface of the eccentric shaft away from the counterbalance is provided with an elastic pin hole fitted with the elastic pin, the elastic pin hole is in fluid communication with the eccentric shaft pin hole, and the elastic pin is configured to abut against the eccentric shaft pin to secure the eccentric shaft pin.

The compressor according to embodiments of the present disclosure includes the above-described crankshaft assembly for the compressor.

In the compressor according to embodiments of the present disclosure, the outer circumferential wall of the eccentric sleeve is provided with the shaft flow hole therethrough in the thickness direction of the eccentric sleeve, such that the lubrication oil between the eccentric shaft and the eccentric sleeve conveniently flows between the eccentric sleeve and the connecting rod through the shaft flow hole, and friction between the eccentric sleeve and the connecting rod can be reduced.

The present disclosure further proposes a crankshaft assembly for a compressor, which includes the above-described crankshaft for the compressor.

The present disclosure further proposes a compressor, which includes the above-described crankshaft assembly for the compressor.

The crankshaft for the compressor according to embodiments of the present disclosure includes a counterbalance; a main shaft provided at a first side of the counterbalance, the main shaft being internally provided with a main lubrication oil passage extending from an axial end of the main shaft to the other axial end of the main shaft, an outer surface of the main shaft being provided with a plurality of oil outlets spaced apart from each other, and each of the oil outlets being in fluid communication with the main lubrication oil passage; and an eccentric shaft provided at a second side of the counterbalance and eccentrically arranged relative to the main shaft.

In the crankshaft for the compressor according to embodiments of the present disclosure, the main shaft is internally provided with the main lubrication oil passage, the main lubrication oil passage extends from an axial end of the main shaft to the other axial end of the main shaft, and lubrication oil in the main lubrication oil passage enters between a shaft hole of the crankcase and the main shaft through the oil outlet of the main shaft, such that the crankshaft can achieve the same oil pumping amount during positive and negative rotation, to satisfy lubrication requirements among various components of the compressor during positive and negative rotation of the crankshaft, to avoid serious abrasion of the crankshaft, and to reduce energy consumption of the compressor.

According to some embodiments of the present disclosure, the main lubrication oil passage extends in a straight line.

According to some embodiments of the present disclosure, the plurality of oil outlets are spaced apart in a length direction of the main shaft.

According to some embodiments of the present disclosure, an outer surface of the eccentric shaft is provided with an oil leakage hole, and the oil leakage hole is directly opposite the eccentric sleeve fitted over the eccentric shaft and is in fluid communication with the main lubrication oil passage.

In some embodiments of the present disclosure, the eccentric shaft is further provided with an annular oil groove, and the annular oil groove is in fluid communication with the oil leakage hole and directly opposite the eccentric sleeve.

In some embodiments of the present disclosure, the oil leakage hole is defined in a bottom wall of the annular oil groove.

According to some embodiments of the present disclosure, a surface of the counterbalance facing the eccentric shaft is provided with an annular protrusion, the annular protrusion is arranged around the eccentric shaft, a terminal end surface of the annular protrusion is configured as a thrust surface, and the eccentric sleeve fitted over the eccentric shaft abuts against the thrust surface.

In some embodiments of the present disclosure, the thrust surface is a smooth and flat surface.

In some embodiments of the present disclosure, a cross section area of the thrust surface is less than an area of an end surface of the eccentric sleeve.

The crankshaft assembly for the compressor according to embodiments of the present disclosure includes the above-described crankshaft; an eccentric sleeve fitted over the eccentric shaft; and a connecting rod and a piston, the connecting rod having a first end fitted over the eccentric sleeve and a second end connected to the piston.

In the crankshaft assembly for the compressor according to embodiments of the present disclosure, the main shaft is internally provided with the main lubrication oil passage, the main lubrication oil passage extends from an axial end of the main shaft to the other axial end of the main shaft, and lubrication oil in the main lubrication oil passage enters between a shaft hole of the crankcase and the main shaft through the oil outlet of the main shaft, such that the crankshaft can achieve the same oil pumping amount during positive and negative rotation, to satisfy lubrication requirements among various components of the compressor during positive and negative rotation of the crankshaft, to avoid serious abrasion of the crankshaft, and to reduce energy consumption of the compressor.

According to some embodiments of the present disclosure, an end surface of an end of the eccentric sleeve away from the counterbalance is provided with a first column and a second column spaced apart in a circumferential direction of the eccentric sleeve; and the crankshaft assembly further includes an eccentric shaft pin, the outer circumferential wall of the eccentric shaft is provided with an eccentric shaft pin hole fitted with the eccentric shaft pin, and the eccentric shaft pin is located between the first column and the second column to selectively engage the first column and the second column.

In some embodiments of the present disclosure, the crankshaft assembly further includes an elastic pin, an end surface of the eccentric shaft away from the counterbalance is provided with an elastic pin hole fitted with the elastic pin, the elastic pin hole is in fluid communication with the eccentric shaft pin hole, and the elastic pin is configured to abut against the eccentric shaft pin to secure the eccentric shaft pin.

The compressor according to embodiments of the present disclosure includes the above-described crankshaft assembly for the compressor.

In the compressor according to embodiments of the present disclosure, the main shaft is internally provided with the main lubrication oil passage, the main lubrication oil passage extends from an axial end of the main shaft to the other axial end of the main shaft, and lubrication oil in the main lubrication oil passage enters between a shaft hole of the crankcase and the main shaft through the oil outlet of the main shaft, such that the crankshaft can achieve the same oil pumping amount during positive and negative rotation, to satisfy lubrication requirements among various components of the compressor during positive and negative rotation of the crankshaft, to avoid serious abrasion of the crankshaft, and to reduce energy consumption of the compressor.

Additional aspects and advantages of the present disclosure will be given in part in the following descriptions, become apparent in part from the following descriptions, or be learned from the practice of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
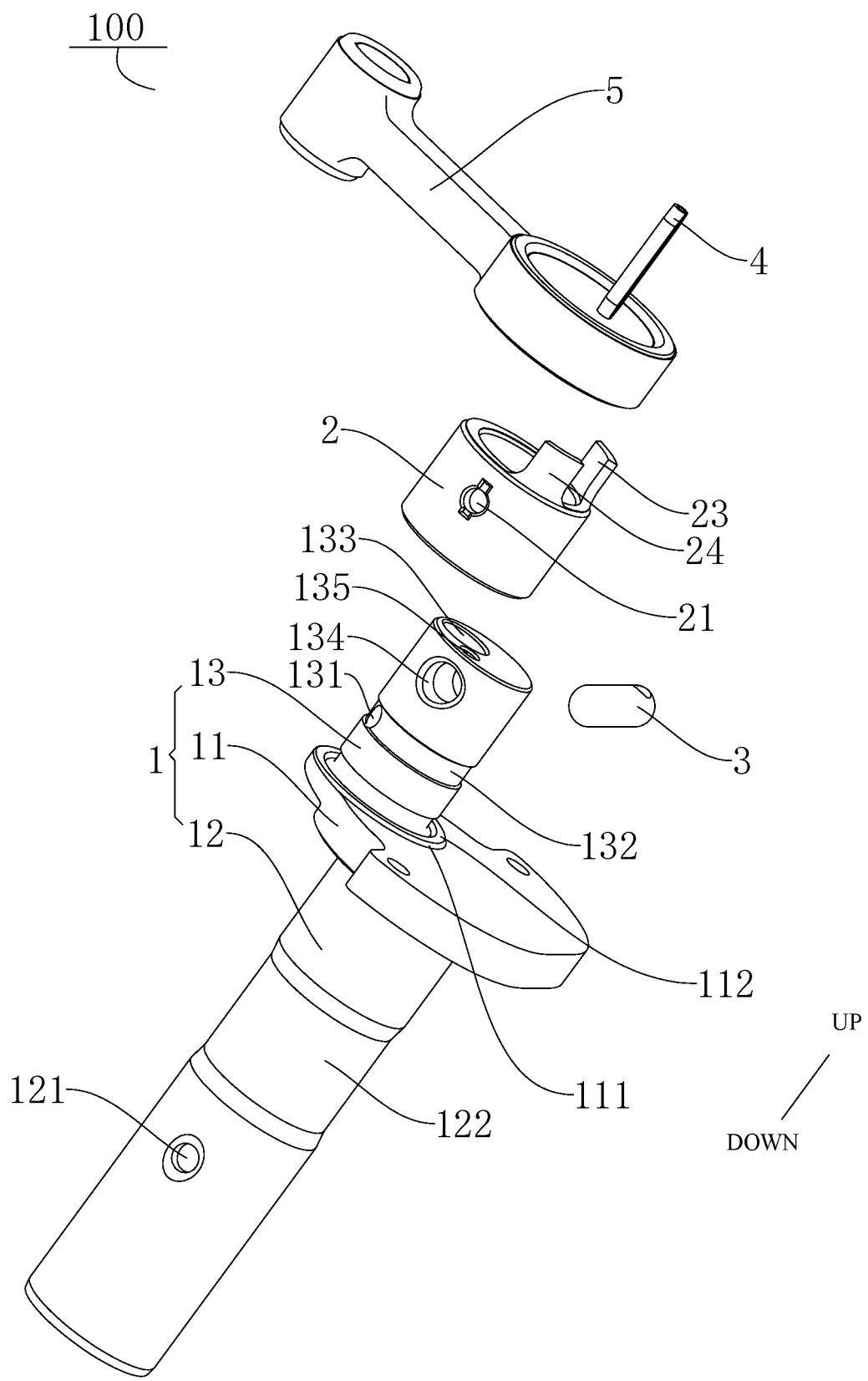
FIG. 1 is an exploded view of a crankshaft assembly for a compressor according to an embodiment of the present disclosure.

REFERENCE NUMERALS crankshaft assembly 100,
crankshaft 1, counterbalance 11, annular protrusion 111, thrust surface 112,
main shaft 12, oil outlet 121, accommodating groove 122, main lubrication oil passage 123, inlet 1231,
eccentric shaft 13, oil leakage hole 131, annular oil groove 132, eccentric oil hole 133, eccentric shaft pin hole 134, elastic pin hole 135,
eccentric sleeve 2, shaft flow hole 21, guide ramp 211, oil groove 22, first column 23, second column 24,
eccentric shaft pin 3, elastic pin 4, connecting rod 5.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and only used to generally understand the present disclosure. The embodiments shall not be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not require that the present disclosure be constructed or operated in a particular orientation. In addition, the feature defined with "first" and "second" may comprise one or more of this feature. In the description of the present disclosure, the term "a plurality of" means two or more than two, unless specified otherwise.

In the description of the present disclosure, unless specified or limited otherwise, it should be noted that, terms "mounted," "connected" and "coupled" may be understood broadly, such as permanent connection or detachable connection, electronic connection or mechanical connection, direct connection or indirect connection via intermediary, inner communication between two elements. The above terms can be understood by those skilled in the art according to specific situations.

An eccentric sleeve 2 for a crankshaft 1 of a compressor according to embodiments of the present disclosure will be described below with reference to FIGS. 1 to 7.

Figure 4:
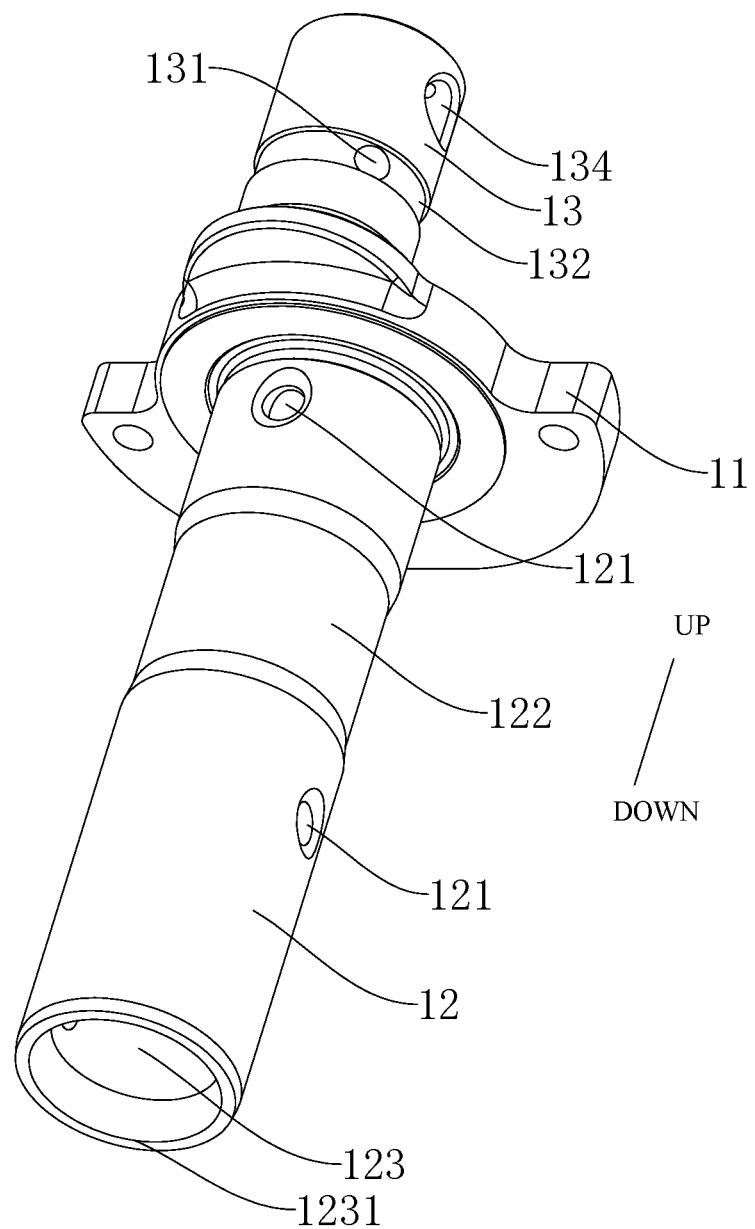
FIG. 4 is a perspective view of a crankshaft of a crankshaft assembly for a compressor according to an embodiment of the present disclosure.
Figure 5:
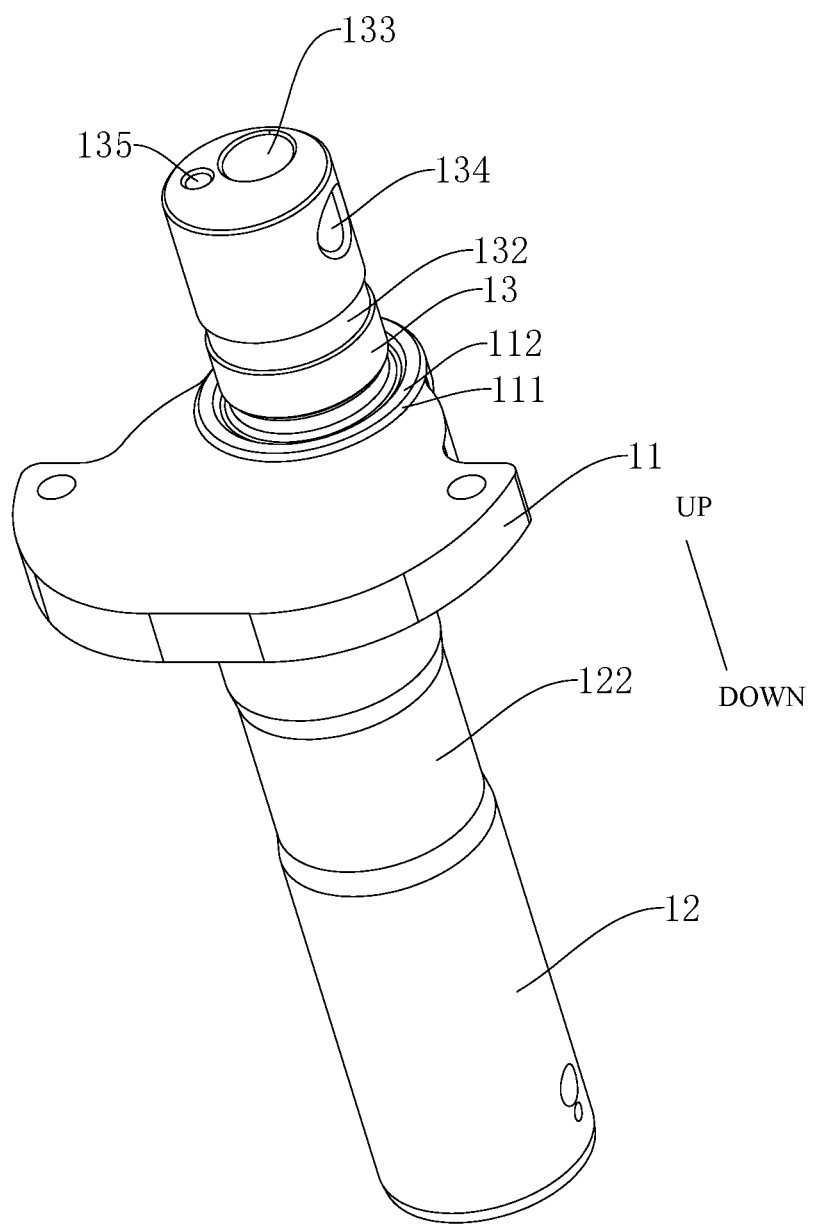
FIG. 5 is a perspective view of a crankshaft of a crankshaft assembly for a compressor from another angle according to an embodiment of the present disclosure.

As illustrated in FIGS. 1, 4 and 5, the crankshaft 1 is secured to a crankcase and includes a counterbalance 11, a main shaft 12 and an eccentric shaft 13. The main shaft 12 is provided at a first side of the counterbalance 11 (for example, a lower or a bottom side illustrated in FIG. 4), and the eccentric shaft 13 is provided at a second side of the counterbalance 11 (for example, an upper or a top side illustrated in FIG. 4) and eccentrically arranged relative to the main shaft 12. The main shaft 12 and the eccentric shaft 13 are provided at two sides of the counterbalance 11 respectively and arranged eccentrically. The main shaft 12 is internally provided with a main lubrication oil passage (an internal fluid passage) 123. The main shaft 12 is internally provided with the main lubrication oil passage 123, the main lubrication oil passage 123 extends from an axial end (such as, a lower end or bottom end) of the main shaft 12 to the other axial end (such as, an upper end or a top end) of the main shaft 12, and lubrication oil in the main lubrication oil passage 123 enters between a shaft hole of the crankcase and the main shaft 12 through an oil outlet 121 of the main shaft 12, such that the crankshaft 1 can achieve the same oil pumping amount during positive and negative rotation, to satisfy lubrication requirements among various components of the compressor during positive and negative rotation of the crankshaft 1, to avoid considerable abrasion of the crankshaft 1, and to reduce energy consumption of the compressor.

An outer circumferential wall of the eccentric shaft 13 is provided with an oil leakage hole 131 in fluid communication with the main lubrication oil passage 123. The lubrication oil in the main lubrication oil passage 123 can enter between the eccentric shaft 13 and the eccentric sleeve 2 through the oil leakage hole 131, to provide lubrication oil for the eccentric shaft 13 and the eccentric sleeve 2 and to reduce abrasion between the eccentric shaft 13 and the eccentric sleeve 2.

Further, the eccentric shaft 13 can be internally provided with an auxiliary lubrication oil passage, the auxiliary lubrication oil passage substantially extends in a length direction of the eccentric shaft 13, an end of the auxiliary lubrication oil passage is in fluid communication with the main lubrication oil passage 123, and the oil leakage hole 131 is in fluid communication with the auxiliary lubrication oil passage. Thus, the oil pumping of the compressor is facilitated, and the lubrication oil conveniently flows from the oil leakage hole 131 between the eccentric shaft 13 and the eccentric sleeve 2.

Figure 7:
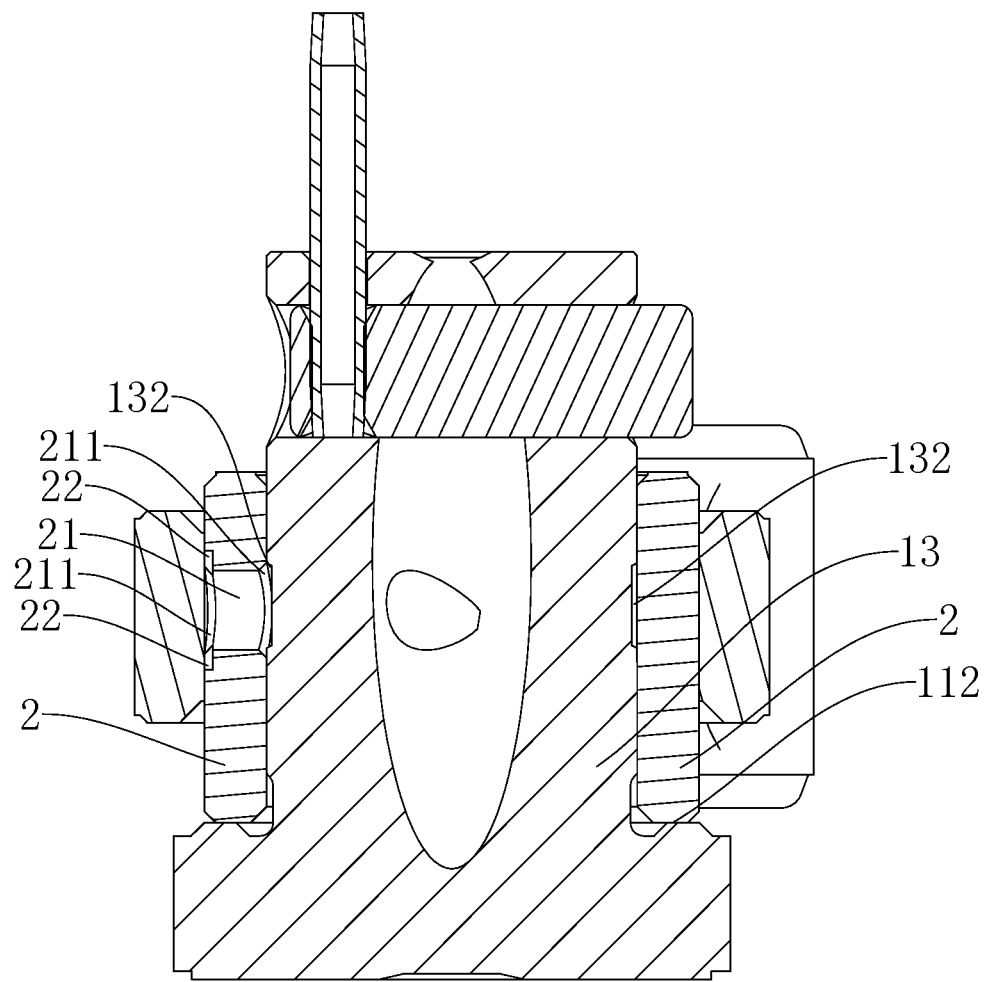
FIG. 7 is a partially sectional view of a crankshaft assembly for a compressor according to an embodiment of the present disclosure.

As illustrated in FIGS. 1 and 7, the eccentric sleeve 2 is fitted over the eccentric shaft 13 and opposite the oil leakage hole 131, and an outer circumferential wall of the eccentric sleeve 2 is provided with a shaft flow hole 21 through the eccentric sleeve (such as, extending through the outer circumferential wall) in a thickness direction of the eccentric sleeve 2. Thus, the lubrication oil between the eccentric shaft 13 and the eccentric sleeve 2 conveniently flows between the eccentric sleeve 2 and the connecting rod 5 through the shaft flow hole 21, and friction between the eccentric sleeve 2 and the connecting rod 5 is reduced.

In the eccentric sleeve 2 for the crankshaft 1 of the compressor, the outer circumferential wall of the eccentric sleeve 2 is provided with the shaft flow hole 21 therethrough in the thickness direction of the eccentric sleeve 2, such that the lubrication oil between the eccentric shaft 13 and the eccentric sleeve 2 conveniently flows between the eccentric sleeve 2 and the connecting rod 5 through the shaft flow hole 21, and friction between the eccentric sleeve 2 and the connecting rod 5 is reduced.

In some embodiments of the present disclosure, as illustrated in FIGS. 1, 4, 5 and 7, the eccentric shaft 13 is also provided with an annular oil groove 132, and the annular oil groove 132 is in fluid communication with the oil leakage hole 131 and directly opposite the shaft flow hole 21. The annular oil groove 132 can store a part of the lubrication oil, and ensure that there is sufficient lubrication oil between the eccentric shaft 13 and the eccentric sleeve 2, to satisfy lubrication requirements between the eccentric shaft 13 and the eccentric sleeve 2. Additionally, the shaft flow hole 21 is opposite the annular oil groove 132, such that the shaft flow hole 21 can be communicated with the annular oil groove 132, thereby increasing the amount of the lubrication oil between the eccentric sleeve 2 and the connecting rod 5, and reducing the friction between the eccentric sleeve 2 and the connecting rod 5.

Further, as illustrated in FIGS. 1 and 4, the oil leakage hole 131 is defined in a bottom wall of the annular oil groove 132. Thus, the lubrication oil from the oil leakage hole 131 conveniently flows into the annular oil groove 132 for storage.

Figure 6:
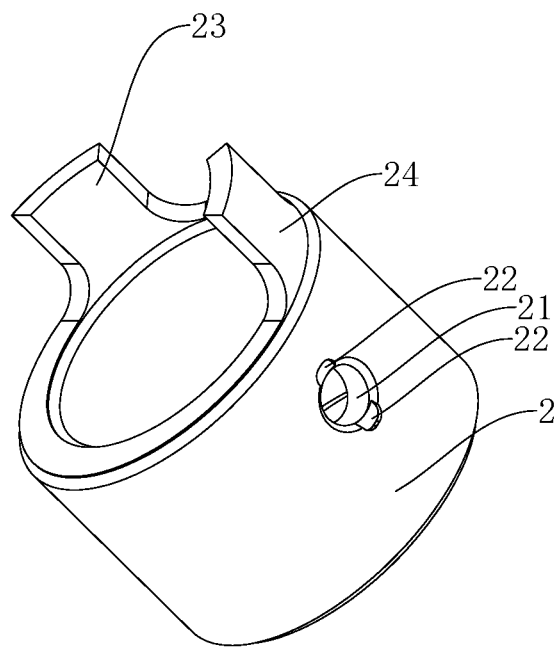
FIG. 6 is a perspective view of an eccentric sleeve for a crankshaft assembly of a compressor according to an embodiment of the present disclosure.

In some embodiments of the present disclosure, as illustrated in FIGS. 6 and 7, the outer circumferential wall of the eccentric sleeve 2 is provided with a plurality of oil grooves 22 in fluid communication with the shaft flow hole 21. Additionally, the amount of oil storage near the shaft flow hole 21 can be increased, and the amount of oil storage for the lubrication oil between the eccentric sleeve 2 and the connecting rod 5 can be increased, thereby reducing the friction between the eccentric sleeve 2 and the connecting rod 5.

Further, as illustrated in FIG. 6, the plurality of oil grooves 22 are evenly spaced apart in a circumferential direction of the shaft flow hole 21. Thus, processing and arrangement of the oil grooves 22 are facilitated. For example, as illustrated in FIG. 6, the outer circumferential wall of the eccentric sleeve 2 is provided with two oil grooves 22 in fluid communication with the shaft flow hole 21, and the two oil grooves 22 are located at an upper side and a lower side of the shaft flow hole 21, respectively.

As illustrated in FIG. 7, two axial ends of the shaft flow hole 21 each have a guide ramp 211. The guide ramp 211 is a trumpet-shaped surface, and a cross section area of the shaft flow hole 21 increases gradually in a direction from an inner end to an outer end of the shaft flow hole 21. The outer end refers to a portion of the shaft flow hole 21 close to the outside environment, and the inner end is relative to the outer end and refers to a portion of the shaft flow hole 21 away from the outside environment.

In some embodiments of the present disclosure, an end of the connecting rod 5 of the compressor is fitted over the eccentric shaft 13, and the shaft flow hole 21 is arranged close to a centerline of the eccentric sleeve 2 perpendicular to an extension line of the connecting rod 5 when the extension line of the connecting rod 5 is parallel to a connection line between the main shaft 12 and the eccentric shaft 13 and the eccentric shaft 13 is located between the main shaft 12 and the connecting rod 5. The connection line between the main shaft 12 and the eccentric shaft 13 is perpendicular to axes of the main shaft 12 and the eccentric shaft 13 separately. Thus, a position of the shaft flow hole 21 can offset from a position of a stress point of the eccentric sleeve 2, thereby decreasing abrasion and stress concentration of the eccentric sleeve 2. By optimizing the structure of the eccentric sleeve 2, stress of the eccentric sleeve 2 during operation of the compressor is reduced, forced deformation of the eccentric sleeve 2 is reduced, and processing difficulty of the eccentric sleeve 2 is reduced.

In some embodiments of the present disclosure, as illustrated in FIGS. 4 and 5, the main lubrication oil passage 123 extends from an axial end of the main shaft 12 to the other axial end of the main shaft 12 (for example, from an upper end to a lower end illustrated in FIG. 4), an inlet of the main lubrication oil passage 123 is provided to the lower end of the main shaft 12, and an outlet of the main lubrication oil passage 123 is provided to the upper end of the main shaft 12. An outer surface of the main shaft 12 is provided with a plurality of oil outlets 121 spaced apart from each other, and each oil outlet 121 is in fluid communication with the main lubrication oil passage 123 to provide lubrication oil between the main shaft 12 and the shaft hole of the crankcase. The main lubrication oil passage 123 can be entirely defined in the main shaft 12, such that the crankshaft 1 can achieve the same oil pumping amount during positive and negative rotation, to satisfy lubrication requirements of the compressor during positive and negative rotation of the crankshaft 1, to avoid serious abrasion of the crankshaft 1, and to reduce energy consumption of the compressor.

Additionally, as illustrated in FIGS. 4 and 5, an outer wall surface of the main shaft 12 is provided with an accommodating groove 122, the accommodating groove 122 extends in a circumferential direction of the main shaft 12, the crankshaft 1 rotates in the shaft hole of the crankcase, the lubrication oil pumped by an oil pumping system can enter the accommodating groove 122 through the oil outlet 121 for storage during rotation of the crankshaft 1, thereby increasing lubrication between the main shaft 12 and the shaft hole of the crankcase.

Further, as illustrated in FIGS. 1 and 4, the main lubrication oil passage 123 extends in a straight line. Thus, oil pumping of the compressor is facilitated, and oil pumping efficiency of the compressor is promoted. Further, an extending direction of the main lubrication oil passage 123 is parallel to an axis of the main shaft 12, and an inner diameter of the main lubrication oil passage 123 is the same in an axis direction of the main shaft 12. Thus, the crankshaft 1 can achieve the same oil pumping amount during positive and negative rotation, to satisfy lubrication requirements of various components of the compressor during positive and negative rotation of the crankshaft 1, to avoid serious abrasion of the crankshaft 1, and to reduce energy consumption of the compressor.

In some embodiments of the present disclosure, as illustrated in FIGS. 1 and 4, the plurality of oil outlets 121 are spaced apart in a length direction of the main shaft 12. Thus, the lubrication oil between the crankcase and the main shaft 12 is more even in the length direction of the main shaft 12, thereby reducing the abrasion of the main shaft 12. Further, the plurality of oil outlets 121 are spaced apart in a circumferential direction of the main shaft 12. Thus, the lubrication oil between the crankcase and the main shaft 12 is more even in the circumferential direction of the main shaft 12, thereby reducing the abrasion of the main shaft 12.

In some embodiments of the present disclosure, as illustrated in FIG. 5, an end surface of the eccentric shaft 13 away from the counterbalance 11 is provided with an eccentric oil hole 133, a center of the eccentric oil hole 133 is away from the axis of the eccentric shaft 13, the eccentric oil hole 133 is arranged close to the oil leakage hole 131, the eccentric oil hole 133 is in fluid communication with the main lubrication oil passage 123, the eccentric oil hole 133 is in fluid communication with the main lubrication oil passage 123 through the auxiliary lubrication oil passage, and the eccentric oil hole 133 is configured as an outlet of the auxiliary lubrication oil passage.

In some embodiments of the present disclosure, as illustrated in FIGS. 1-3 and 5, a surface of the counterbalance 11 facing the eccentric shaft 13 is provided with an annular protrusion 111, the annular protrusion 111 is arranged around the eccentric shaft 13, a terminal end surface of the annular protrusion 111 is configured as a thrust surface 112, and the eccentric sleeve 2, once fitted over the eccentric shaft 13, abuts against the thrust surface 112. Thus, a contact area between surfaces of the eccentric sleeve 2 and the counterbalance 11 can be decreased, the abrasion of the eccentric sleeve 2 can be additionally reduced, and the energy consumption of the compressor during operation can be reduced.

Further, the thrust surface 112 is a smooth and flat surface. Thus, friction between the eccentric sleeve 2 and the thrust surface 112 can be further reduced, the abrasion of the eccentric sleeve 2 can be reduced, the energy consumption of the compressor during operation can be reduced, and the performance of the compressor can be improved. In some embodiments of the present disclosure, a cross section area of the thrust surface 112 is less than an area of an end surface of the eccentric sleeve 2. Thus, a contact area between the end surface of the eccentric sleeve 2 close to the counterbalance 11 and the thrust surface 112 can be decreased, the abrasion of the eccentric sleeve 2 can be further reduced, the energy consumption of the compressor during operation can be reduced, and the performance of the compressor can be improved.

A crankshaft assembly 100 for a compressor according to embodiments of the present disclosure will be described below with reference to FIGS. 1 to 7.

As illustrated in FIG. 1, the crankshaft assembly 100 for the compressor according to embodiments of the present disclosure includes the above-described crankshaft 1, the above-described eccentric sleeve 2, a connecting rod 5 and a piston.

Specifically, the crankshaft 1 is secured to a crankcase and includes a counterbalance 11, a main shaft 12 and an eccentric shaft 13. The main shaft 12 and the eccentric shaft 13 are provided at two sides of the counterbalance 11 respectively and arranged eccentrically, the main shaft 12 is internally provided with a main lubrication oil passage 123, and an outer circumferential wall of the eccentric shaft 13 is provided with an oil leakage hole 131 in fluid communication with the main lubrication oil passage 123.

An electric motor of the compressor generates a magnetic field to drive a rotor to rotate, and the main shaft 12 of the crankshaft 1 is secured to the rotor in an interference fit way to rotate with the rotor. The eccentric sleeve 2 is fitted over the eccentric shaft 13, the eccentric sleeve 2 and the eccentric shaft 13 are coaxial, and the connecting rod 5 has a first end fitted over the eccentric sleeve 2 and a second end connected to the piston. The eccentric shaft 13 can rotate with the axis of the main shaft 12 as a center, and the eccentric shaft 13 is rotatably connected to the connecting rod 5. Since the eccentric shaft 13 and the main shaft 12 are eccentrically arranged, the connecting rod 5 can reciprocate in a straight line during rotation of the crankshaft 1, so as to compress a refrigerant gas. Work principles of the above-described crankshaft 1 and the connecting rod 5 are well known by those skilled in the art, which will not be elaborated herein.

In the crankshaft assembly 100 for the compressor according to embodiments of the present disclosure, the outer circumferential wall of the eccentric sleeve 2 is provided with the shaft flow hole 21 therethrough in the thickness direction of the eccentric sleeve 2, such that the lubrication oil between the eccentric shaft 13 and the eccentric sleeve 2 conveniently flows between the eccentric sleeve 2 and the connecting rod 5 through the shaft flow hole 21, and friction between the eccentric sleeve 2 and the connecting rod 5 is reduced.

Figure 2:
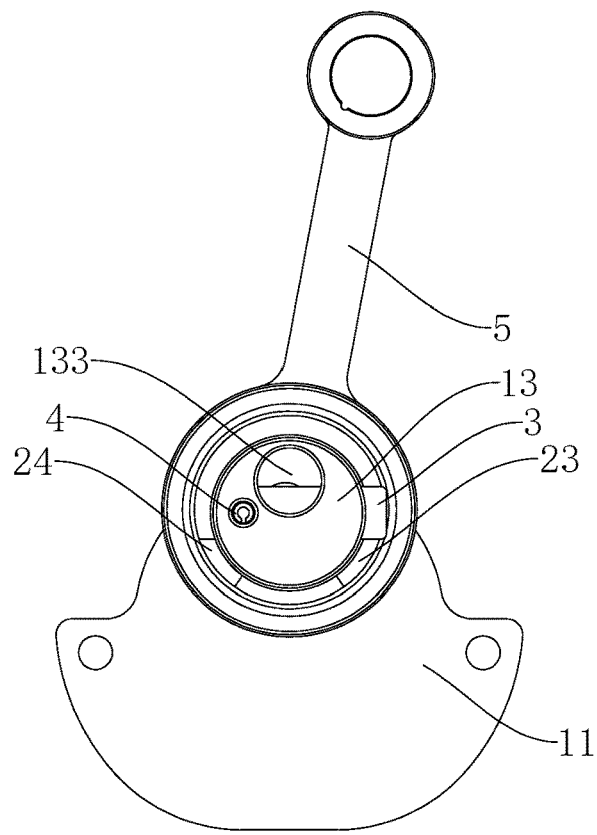
FIG. 2 is a top view of a crankshaft assembly for a compressor according to an embodiment of the present disclosure, in which an eccentric shaft pin is fitted with a first column.
Figure 3:
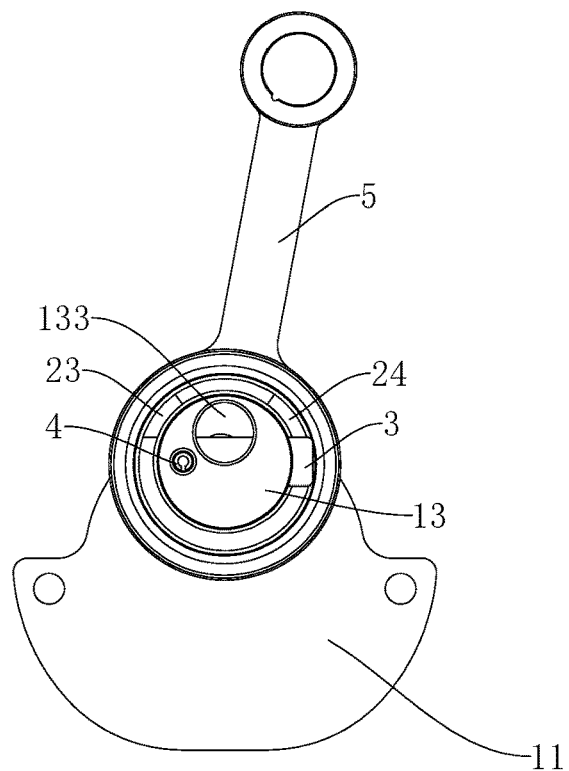
FIG. 3 is a top view of a crankshaft assembly for a compressor according to an embodiment of the present disclosure, in which an eccentric shaft pin is fitted with a second column.

In some embodiments of the present disclosure, as illustrated in FIGS. 1 to 3, an end surface of the eccentric sleeve 2 away from the counterbalance 11 is provided with a first column 23 and a second column 2, and the first column 23 and the second column 2 are spaced apart in the circumferential direction of the eccentric sleeve 2. The crankshaft assembly 100 also includes an eccentric shaft pin 3, the outer circumferential wall of the eccentric shaft 13 is provided with an eccentric shaft pin hole 134 fitted with the eccentric shaft pin 3, and the eccentric shaft pin 3 is located between the first column 23 and the second column 24 to selectively engage the first column 23 and the second column 24. The crankshaft 1 drives the eccentric shaft pin 3 to rotate during rotation thereof. When the crankshaft 1 rotates positively (for example, rotating in a clockwise direction illustrated in FIG. 2), the eccentric shaft pin 3 comes into contact with the first column 23 of the eccentric sleeve 2 and remains stationary with the first column 23 of the eccentric sleeve 2, to drives the eccentric sleeve 2 to rotate along with the eccentric shaft 13; when the crankshaft 1 rotates negatively (for example, rotating in a counterclockwise direction illustrated in FIG. 3), the eccentric shaft pin 3 comes into contact with the second column 24 of the eccentric sleeve 2 and remains stationary with the second column 24 of the eccentric sleeve 2, such that change on eccentricity of the crankshaft 1 during positive and negative rotation of the compressor is realized, and the eccentric sleeve 2 is driven to rotate along with the eccentric shaft 13 of the crankshaft 1.

Further, as illustrated in FIG. 1, the crankshaft assembly 100 further includes an elastic pin 4, the end surface of the eccentric shaft 13 away from the counterbalance 11 is provided with an elastic pin hole 135 fitted with the elastic pin 4, the elastic pin hole 135 is in fluid communication with the eccentric shaft pin hole 134, the elastic pin 4 is configured to abut against the eccentric shaft pin 3 to secure the eccentric shaft pin 3, such that the eccentric shaft pin 3 is more reliably secured, and operational reliability of the crankshaft assembly 100 is improved.

A compressor according to embodiments of the present disclosure will be described below with reference to FIGS. 1 to 7.

The compressor according to embodiments of the present disclosure includes the above-described crankshaft assembly 100 for the compressor.

In compressor according to embodiments of the present disclosure, the outer circumferential wall of the eccentric sleeve 2 is provided with the shaft flow hole 21 therethrough in the thickness direction of the eccentric sleeve 2, such that the lubrication oil between the eccentric shaft 13 and the eccentric sleeve 2 conveniently flows between the eccentric sleeve 2 and the connecting rod 5 through the shaft flow hole 21, and friction between the eccentric sleeve 2 and the connecting rod 5 is reduced.

Reference throughout this specification to "an embodiment," "some embodiments," "an illustrative embodiment" "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and illustrated, it shall be understood by those skilled in the art that various changes, modifications, alternatives and variants without departing from the principle of the present disclosure are acceptable. The scope of the present disclosure is defined by the claims or the like.

We claim:

1. A combination of a crankshaft and an eccentric sleeve, used for a compressor,
   the crankshaft extending along an axis, the crankshaft comprising:
   a main shaft,
   a counterbalance, and
   an eccentric shaft,
   wherein the main shaft and the eccentric shaft are provided at two axial sides of the counterbalance respectively, and arranged eccentrically, and
   wherein the main shaft is provided internally with a main lubrication oil passage, and an outer circumferential wall of the eccentric shaft is provided with an oil leakage hole in fluid communication with the main lubrication oil passage; and
   the eccentric sleeve fittable over the eccentric shaft,
   wherein an outer circumferential wall of the eccentric sleeve is provided with a shaft flow hole extending through the outer circumferential wall in a thickness direction of the eccentric sleeve, and
   wherein the shaft flow hole is in fluid communication with the oil leakage hole of the eccentric shaft.

2. The combination according to claim 1,
   wherein the eccentric shaft is further provided with an annular oil groove extending circumferentially in the outer circumferential wall of the eccentric shaft; and
   wherein the annular oil groove is in fluid communication with the oil leakage hole and the shaft flow hole.

3. The combination according to claim 2, wherein the oil leakage hole is provided in a bottom portion of the annular oil groove.

4. The combination according to claim 1, wherein the outer circumferential wall of the eccentric sleeve is provided with a plurality of oil grooves in fluid communication with the shaft flow hole.

5. The combination according to claim 4, wherein the plurality of oil grooves are spaced apart in a circumferential direction of the shaft flow hole.

6. The combination according to claim 1, wherein the eccentric sleeve further comprises a guide ramp provided at each axial end of the shaft flow hole.

7. The combination according to claim 1,
   wherein the main lubrication oil passage extends from an axial end of the main shaft to an opposite axial end of the main shaft; and
   wherein an outer surface of the main shaft is provided with a plurality of oil outlets spaced apart from each other, each oil outlet being in fluid communication with the main lubrication oil passage.

8. The combination according to claim 1, wherein the plurality of oil outlets are axially spaced apart from each other.

9. The combination according to claim 1,
   wherein the counterbalance has a surface provided with an annular protrusion, the surface facing the eccentric sleeve;
   wherein the annular protrusion is arranged around the eccentric shaft and has a terminal end surface; and
   wherein the terminal end surface is configured as a thrust surface, such that the eccentric sleeve abuts against the thrust surface once the eccentric sleeve is fitted over the eccentric shaft.

10. The combination according to claim 9, wherein the thrust surface is a smooth and flat surface and the thrust surface has a cross section area smaller that of an area of a terminal end surface of the eccentric sleeve.

11. The combination according to claim 1,
wherein the eccentric sleeve has an end surface away from the counterbalance;
wherein the eccentric sleeve further comprises a first column and a second column provided on said end surface away from the counterbalance;
wherein the first column and the second column are spaced apart in a circumferential direction of the eccentric sleeve; and
wherein the outer circumferential wall of the eccentric shaft is provided with an eccentric shaft pin hole configured to receive an eccentric shaft pin, such that the eccentric shaft pin is located between the first column and the second column to selectively engage the first column and the second column.

12. An eccentric sleeve for a crankshaft of a compressor,
wherein the crankshaft comprises a main shaft, a counterbalance and an eccentric shaft, the main shaft and the eccentric shaft being provided at two axial sides of the counterbalance respectively and arranged eccentrically, the main shaft being internally provided with a main lubrication oil passage, an outer circumferential wall of the eccentric shaft being provided with an oil leakage hole in fluid communication with the main lubrication oil passage,
the eccentric sleeve comprising:
an outer circumferential wall; and
a shaft flow hole extending through the outer circumferential wall in a thickness direction of the eccentric sleeve, such that the shaft flow hole is in fluid communication with the oil leakage hole of the eccentric shaft once the eccentric sleeve is fitted over the eccentric shaft.

13. The eccentric sleeve according to claim 12, wherein the outer circumferential wall of the eccentric sleeve is provided with a plurality of oil grooves in fluid communication with the shaft flow hole.

14. The eccentric sleeve according to claim 13, wherein the plurality of oil grooves are spaced apart in a circumferential direction of the shaft flow hole.

15. The eccentric sleeve according to claim 12, further comprising a guide ramp provided at each axial end of the shaft flow hole.

16. The eccentric sleeve according to claim 12,
wherein the eccentric sleeve has an end surface away from the counterbalance;
wherein the eccentric sleeve further comprises a first column and a second column provided on said end surface away from the counterbalance; and
wherein the first column and the second column are spaced apart in a circumferential direction of the eccentric sleeve, such that, when an eccentric shaft pin is received in an eccentric shaft pin hole of the outer circumferential wall of the eccentric shaft, the eccentric shaft pin is located between the first column and the second column to selectively engage the first column and the second column.

17. A crankshaft for a compressor, comprising:
a counterbalance;
a main shaft provided at a first side of the counterbalance, the main shaft being internally provided with a main lubrication oil passage extending from an axial end of the main shaft to the other axial end of the main shaft, an outer surface of the main shaft being provided with a plurality of oil outlets axially spaced apart from each other, and each of the oil outlets being in communication with the main lubrication oil passage; and
an eccentric shaft provided at a second side of the counterbalance and arranged eccentrically relative to the main shaft.

18. The crankshaft according to claim 17,
wherein the eccentric shaft is further provided with an annular oil groove extending circumferentially in the outer circumferential wall of the eccentric shaft; and
wherein the annular oil groove is in fluid communication with the oil leakage hole.

19. The crankshaft according to claim 18, wherein the oil leakage hole is provided in a bottom portion of the annular oil groove.

20. The crankshaft according to claim 17,
wherein the counterbalance has a surface provided with an annular protrusion, the surface facing an eccentric sleeve engageable with the eccentric shaft;
wherein the annular protrusion is arranged around the eccentric shaft and has a terminal end surface; and
wherein the terminal end surface is configured as a thrust surface, such that the eccentric sleeve abuts against the thrust surface once the eccentric sleeve is fitted over the eccentric shaft.

* * * * *